US008792490B2

(12) United States Patent
Jabr et al.

(10) Patent No.: US 8,792,490 B2
(45) Date of Patent: Jul. 29, 2014

(54) LOGICALLY PARTITIONED NETWORKING DEVICES

(75) Inventors: Khalil Jabr, Lake Oswego, OR (US); S. Scott Van de Houten, Geneva, FL (US); Victor M. Moreno, Carlsbad, CA (US)

(73) Assignee: Cisco Technology, Inc., San Jose, CA (US)

(*) Notice: Subject to any disclaimer, the term of this patent is extended or adjusted under 35 U.S.C. 154(b) by 440 days.

(21) Appl. No.: 12/404,608

(22) Filed: Mar. 16, 2009

(65) Prior Publication Data

US 2010/0232435 A1    Sep. 16, 2010

(51) Int. Cl.
*H04L 12/28* (2006.01)
*H04L 12/56* (2006.01)
*H04L 12/46* (2006.01)

(52) U.S. Cl.
CPC .......... *H04L 12/4645* (2013.01); *H04L 12/465* (2013.01); *H04L 12/4666* (2013.01); *H04L 12/4641* (2013.01); *H04L 45/00* (2013.01)
USPC .......................................... 370/392; 370/389

(58) Field of Classification Search
None
See application file for complete search history.

(56) References Cited

U.S. PATENT DOCUMENTS

| | | | | |
|---|---|---|---|---|
| 6,414,956 B1* | 7/2002 | Szczepanek | ................... | 370/392 |
| 6,438,612 B1* | 8/2002 | Ylonen et al. | ................ | 709/249 |
| 6,788,681 B1* | 9/2004 | Hurren et al. | ................ | 370/389 |
| 7,471,631 B2* | 12/2008 | Kang et al. | ..................... | 370/235 |
| 7,787,480 B1* | 8/2010 | Mehta et al. | .................. | 370/401 |
| 2002/0037010 A1* | 3/2002 | Yamauchi | ................ | 370/395.53 |
| 2003/0225892 A1* | 12/2003 | Takusagawa et al. | ......... | 709/227 |
| 2004/0076165 A1* | 4/2004 | Jean-Francois et al. | ...... | 370/400 |
| 2005/0063397 A1* | 3/2005 | Wu et al. | ....................... | 370/401 |
| 2005/0157721 A1* | 7/2005 | Rabie et al. | .................... | 370/392 |
| 2006/0069943 A1* | 3/2006 | Nakamura et al. | ................ | 714/5 |
| 2006/0161692 A1* | 7/2006 | Zilavy | .............................. | 710/8 |
| 2007/0058638 A1* | 3/2007 | Guichard et al. | ........ | 370/395.31 |
| 2007/0140250 A1* | 6/2007 | McAllister et al. | ........... | 370/392 |
| 2007/0180274 A1* | 8/2007 | Eguchi et al. | ................. | 713/193 |
| 2007/0226386 A1* | 9/2007 | Sharp et al. | ..................... | 710/62 |
| 2007/0237148 A1 | 10/2007 | Jabr et al. | | |
| 2008/0148341 A1* | 6/2008 | Ferguson et al. | ................. | 726/1 |
| 2008/0240113 A1* | 10/2008 | Arad et al. | ............... | 370/395.53 |
| 2009/0037607 A1 | 2/2009 | Farinacci et al. | | |
| 2009/0059914 A1* | 3/2009 | Khalid et al. | .................. | 370/389 |
| 2009/0154470 A1* | 6/2009 | Kuc | ........................ | 370/395.53 |
| 2009/0303883 A1* | 12/2009 | Kucharczyk et al. | ......... | 370/241 |
| 2011/0035494 A1* | 2/2011 | Pandey et al. | ................. | 709/224 |

* cited by examiner

*Primary Examiner* — Ayaz Sheikh
*Assistant Examiner* — Peter Chau
(74) *Attorney, Agent, or Firm* — Patterson + Sheridan, LLP (57) ABSTRACT

Systems, methods, and other embodiments associated with logically partitioned networking devices are described herein. One example method includes receiving a message from a common interface. The message comprises a logical partition header (LPH) and a network segmentation header (NSH). The LPH may be associated with a logical partition of a networking device. The NSH is associated with a grouping (e.g., segmentation) of networking devices. The example method may also include forwarding the message to the grouping of networking devices based, at least in part, on the NSH and a virtual route forwarding (VRF) table. Forwarding the message to the logical partition of the networking device based, at least in part, on the LPH.

25 Claims, 8 Drawing Sheets

LOGICALLY PARTITIONED NETWORKING DEVICES

CROSS REFERENCE TO RELATED APPLICATIONS

This application is related to the following U.S. patent application, which is assigned to the present assignee: "SYSTEM AND METHODS FOR NETWORK SEGMENTATION", Ser. No. 11/226,011, Filing Date: Sep. 14, 2005, Inventors: Jim Guichard, Warren Wainner, Saul Adler, Khalil Jabr, and S. Scott Van De Houten, Docket: CPOL 61759.

BACKGROUND

Sophisticated networking devices have enough resources to support multiple logical instances of the networking device. Thus, a networking device may be logically partitioned to into multiple sets of resources so that each set of resources can be operated independently with its own operating system and/or applications. Issues may arise when segmented networks are used with logically partitioned networking devices.

Many enterprises wish to run multiple network segments within the same campus, wide area network (WAN), or data center environment. A network segment may be associated with a virtual local area network (VLAN). A VLAN may include a group of servers and/or hosts with a common set of requirements that communicate via broadcasting on the data link layer. The data link layer maps to the second level (L2) of an open systems interconnect (OSI) networking model. A network segment may be represented by a label or tag. In one example, the label may be a VLAN identifier (VLAN ID). While a VLAN ID is described, one skilled in the art will appreciate that more generally a segment identifier may be employed. The use of VLAN technology to create numerous L2 parallel network-wide segments may be cumbersome, unreliable, and prone to configuration errors. Thus, the scope of L2 network segmentation may be constrained to the campus environment to avoid establishing large L2/VLAN broadcast domains (e.g., network segment) over a wide area network (WAN) like the Internet. Constraining L2 network segmentation may prevent proliferation of parallel networks over large public networks that cannot be configured to accept the VLAN segmentation. Proliferation may be a problem because a large number of networking devices in the WAN would have to be configured to accept the segmentation of the network. In some instances, creation of parallel networks may not be allowed on public networks, while creation of parallel networks may be allowed on smaller campus networks.

Typically, enterprises used level three (L3) routing to process packets crossing into a WAN and to limit the size of the L2 domains in a campus network. These typical embodiments also use L3 segmentation processes including virtual route forwarding (VRF) and virtual routing (VR) to preserve the network segment information when transmitting data across the WAN. These processes may be performed without creating a parallel network on a WAN. Enterprises distribute internet protocol (IP) services, for example, voice over Internet protocol (VoIP) end-points, security controls, and quarantine segments, throughout the campus or data center environment. As a result, VLAN technology has become increasingly complicated.

The use of L2 access control lists between the VLAN segments may have complicated management and security. Thus, enterprises turned to L3 Internet Protocol (IP) aware routing and security technologies to manage the IP applications and assets associated with network segments. As a result, distribution of L3 routing segmentation processes has gone deeper into campus networks and/or local data centers. Typical L3 segmentation employs parallel L2 VLAN segments, dedicated interfaces for VLAN segments, and per segment routing processes and routing tables.

Virtual Networks (vNETs) may solve issues related to scalability and inter-segment traffic flows by allowing support for segmentation at the L2 level where previous embodiments required segmentation to be performed at the L3 level. A virtual private network (VPN) may be an example of a vNET that satisfies the issues related to scalability and inter-segment traffic flows. vNETs may include the coupling of Ethernet VLAN segments and virtual route forwarding (VRF) tables to facilitate dividing network segments through L2 switching entities (L2SE) and L3 routing entities (L3RE). This may allow segmentation at the L2 switching level and also allow L3 routing. For example, L2 switching may occur within a campus network and L3 routing may occur when crossing into a WAN including the Internet. This may prevent a need for configuring WAN networking devices with information associated with the parallel networks segments.

However, issues may occur with network segmentation schemes (e.g., vNETs and VPNs) that are used with network devices that are logically partitioned. Logically partitioned network devices may include different subsets of a networking device hardware and/or resource that may be virtualized as separate networking devices and/or separate computing devices. In effect, a computing device may be partitioned into multiple logical devices housing separate applications and/or operating systems. Network devices that are logically partitioned may employ VRF tables and/or routing tables for each logical partition to route information associated with network segments. Thus, it may be difficult to use logically partitioned network devices with vNET networking environments. One skilled in the art will appreciate that multiple virtual route forwarding tables and multiple VLANs may exist within a single virtual network device. Although there may be multiple virtual route forwarding tables and multiple VLANs in a virtual network device, and although there may be multiple virtual network devices in a single physical network device, the virtual route forwarding tables and the VLANS in a virtual network device are independent of other virtual route forwarding tables and VLANS in other virtual network devices, even if the virtual network devices are located in the same physical device.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Logical partitioning of networking devices may include a data packet identifying a particular logical partition or virtual networking device (VND) with which the data packet desires to interact. Identification may be performed by including a header in the data packet that identifies the VND that is to route and/or forward the data packet. The header may be a VLAN tag identifying the logical partition. For example, as the data packet is read by the networking device, the networking device may examine the header and determine that the data packet is associated with the first VND. The first VND may be a logical partition resident on the networking device examining data packets. In a conventional embodiment, the first VND may have a set of virtual route forwarding (VRF) tables and a set of routing protocols that are used for forwarding information. Similarly, other VNDs may also have their own sets of VRF tables and sets of routing protocols for forwarding. However, a single link (e.g., special link) may interconnect the logical partitions of the networking devices to the VRF tables and routing protocols of other logical partitions and/or other network segments. The virtual network (vNET) model (e.g., VPNs) may not work with logically partitioned devices without this special link.

The special link may be facilitated by a dual header that contains information regarding labels (e.g., VLAN IDs) associated with logical partitions (e.g., a first header) and information regarding labels (e.g., VLAN IDs) associated with network segments (e.g. a second header). While VLAN IDs are provided as examples, one skilled in the art will appreciate that the first header or label may identify the logical partition using other identifiers. Similarly, the second header or label may identify the network segment using other identifiers. For example, a multi-protocol label switching (MPLS) tag may be repurposed to identify a partition or network segment. Identification of the particular VRF table and/or routing table that is to be used for forwarding the data packet by the VND may be facilitated by the dual header. The dual header may be an 802.1q standard QinQ header. This QinQ header may be associated with provider bridges under 802.1ad, which is an amendment to the 802.1q standard. While a QinQ header is described, it is to be appreciated that the dual header may generically provide double header encapsulation to allow for logically partitioned devices to use a special link to carry logical partition identification information in an outer header and to carry virtual route forwarding table and/or virtual network identification information in an inner header. The dual header may allow a networking device to bridge the VRF tables and routing protocols associated with a logical partition and the VRF tables and routing protocols associated with network segments. The dual header may allow for independence between logical partitions of networking devices while allowing sharing of network components and/or networking interfaces (e.g., VRF tables and routing protocols) between the logical partitions and network segments. In one embodiment, the QinQ header includes an outer VLAN tag and an inner VLAN tag. The outer VLAN tag (e.g., outer tag or outer header) may be associated with a logical partitioning of the networking device. The inner VLAN tag (e.g., inner tag or inner header) may be associated with a network segment. For one example header see header 600 in FIG. 6.

In one embodiment, a system administrator may define a special link between a first networking device and a neighboring network device. The special link may be configured to carry specially encapsulated data packets that include the dual header. The first networking device may authenticate the neighboring networking device. If the authentication is successful the special link between the first network device and the second network device goes into an operational state. Both networking devices may be in the same campus and/or local area network. The first networking device may receive the dual header data packet and route it via L2 to the neighboring networking device. If there is one special link defined between both of the networking devices, the software of both of the networking devices may recognize multiple logical links. The software of the networking devices may treat each outer and inner VLAN ID combination as an identifier associated with a logical link. For example, an outer VLAN ID of 1 and an inner VLAN ID of 10 may be associated with a first logical link, an outer VLAN ID of 2 and an inner VLAN ID of 11 may be associated with a second logical link, and so on. The special link may be defined with one single subnet or common link that includes multiple logical links.

Logical links may inherit the address of the single subnet. The subnet may only be between the first network device and the neighboring networking device or it may include a larger network, for example, a campus network. The use of the address of the single subnet for all of the logical links may minimize the changes required to the software of neighboring network devices. For example, without the dual header providing a link to the VRF tables, each logical partition would not have to have access to the full set of VRF tables to distribute data packets. Changes may also be minimized to other networking devices connected to the single subnet via a campus network. Additionally, the use of the single subnet address may also minimize changes to a multicast reverse path forwarding (RPF) check. The dual header may allow multicast packets to be labeled the same as unicast packets. RPF may be performed on the special link using the single subnet. RPF may also be performed on a per VRF/vNET basis.

The dual header may facilitate a multiplex (MUX) and/or de-multiplex (DMUX) function that is provided for the control plane to compliment the data plane MUX/DMUX functionality. Thus, a control plane data packet may be handled in the same way that data plane traffic is handled. A control plane data packet that belongs to a specific VRF in a specific virtual device context (VDC) may include data headers to facilitate MUXing and DMUXing the data packet on and off of a connection. The data headers may facilitate sending the data packet to the correct control plane process. The use of the dual header may allow the MUX and DMUX without modification and/or addition of special software to the control plane and/or networking devices.

DETAILED DESCRIPTION

Figure 1:
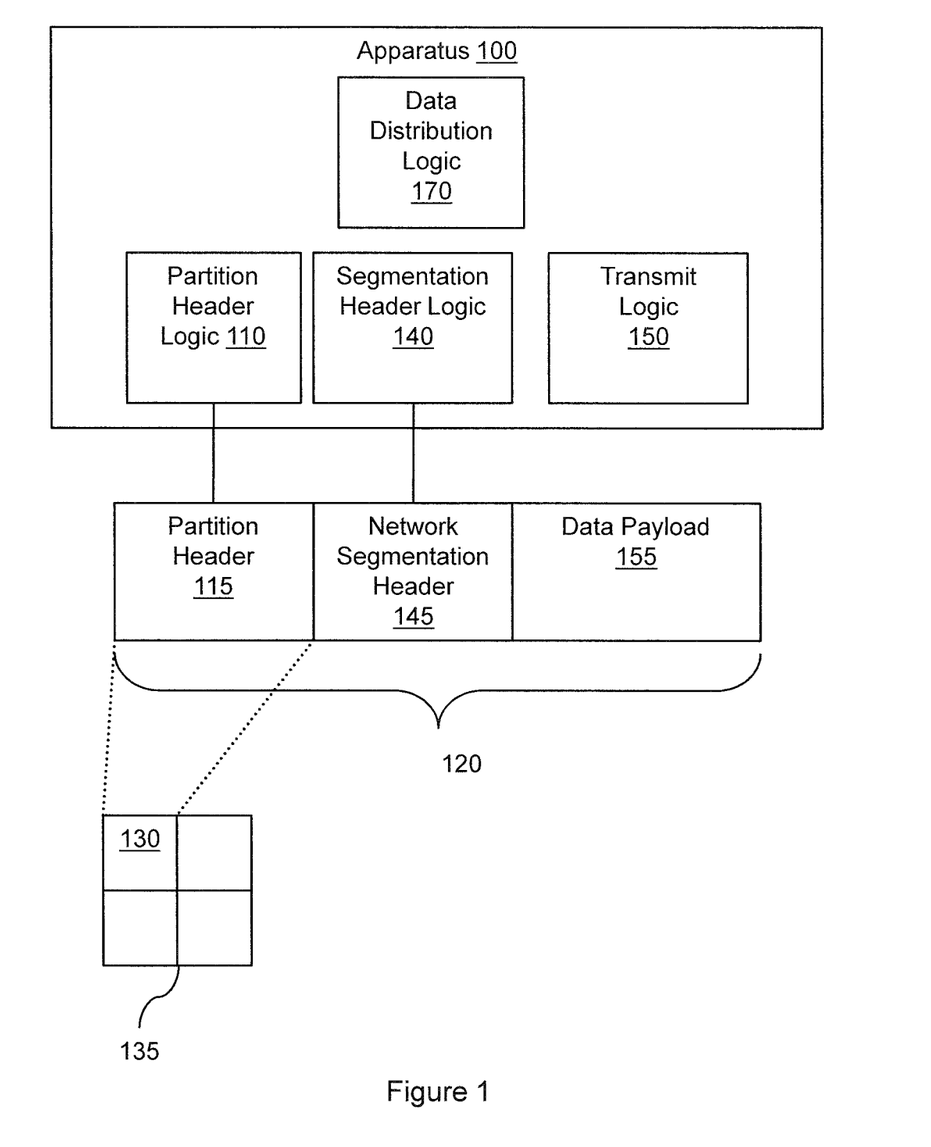
FIG. 1 illustrates an example apparatus associated with logically partitioned networking devices.

FIG. 1 illustrates an apparatus 100 associated with logically partitioned networking devices. Apparatus 100 includes a partition header logic 110 to insert a partition header 115 into a data packet 120. The partition header 115 may identify a member 130 of a set of logical partitions 135. In one embodiment, the set of logical partitions 135 may partition a networking device. The networking device may be a gateway, a router, a networking switch, and so on.

Figure 2:
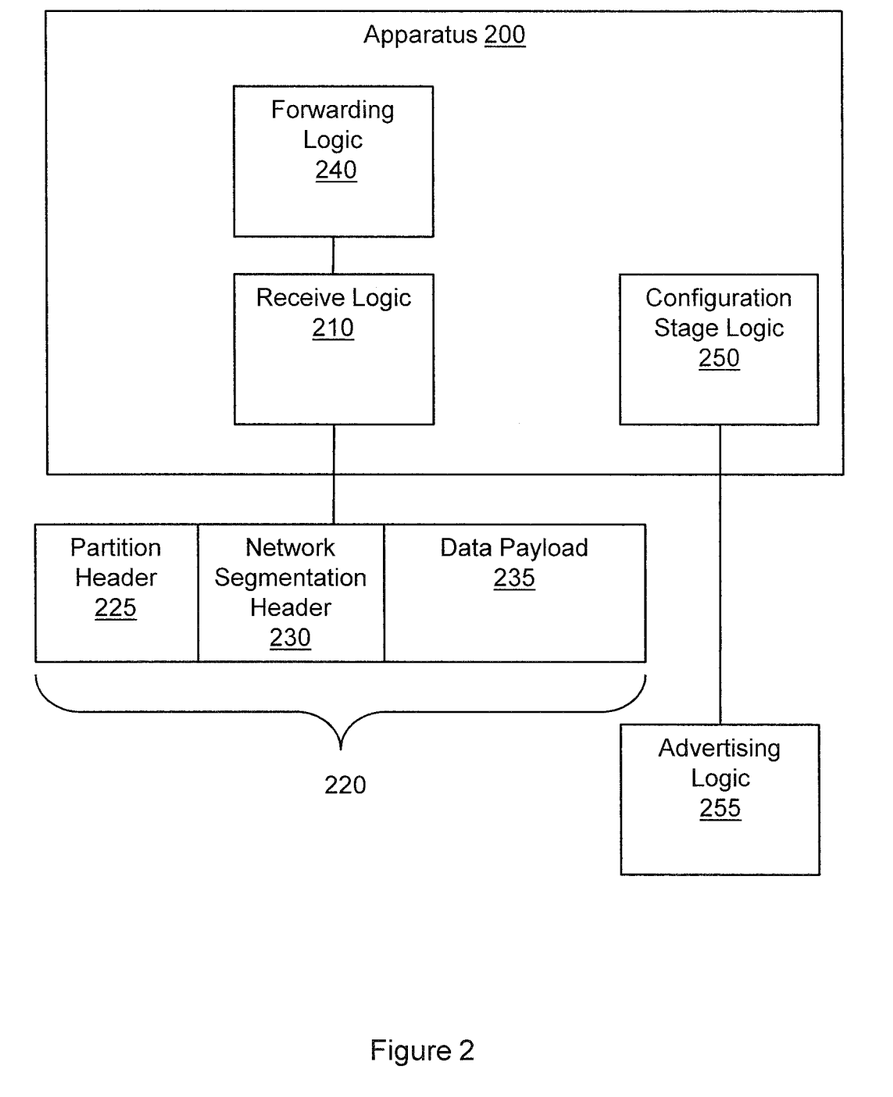
FIG. 2 illustrates another example apparatus associated with logically partitioned networking devices.
Figure 8:
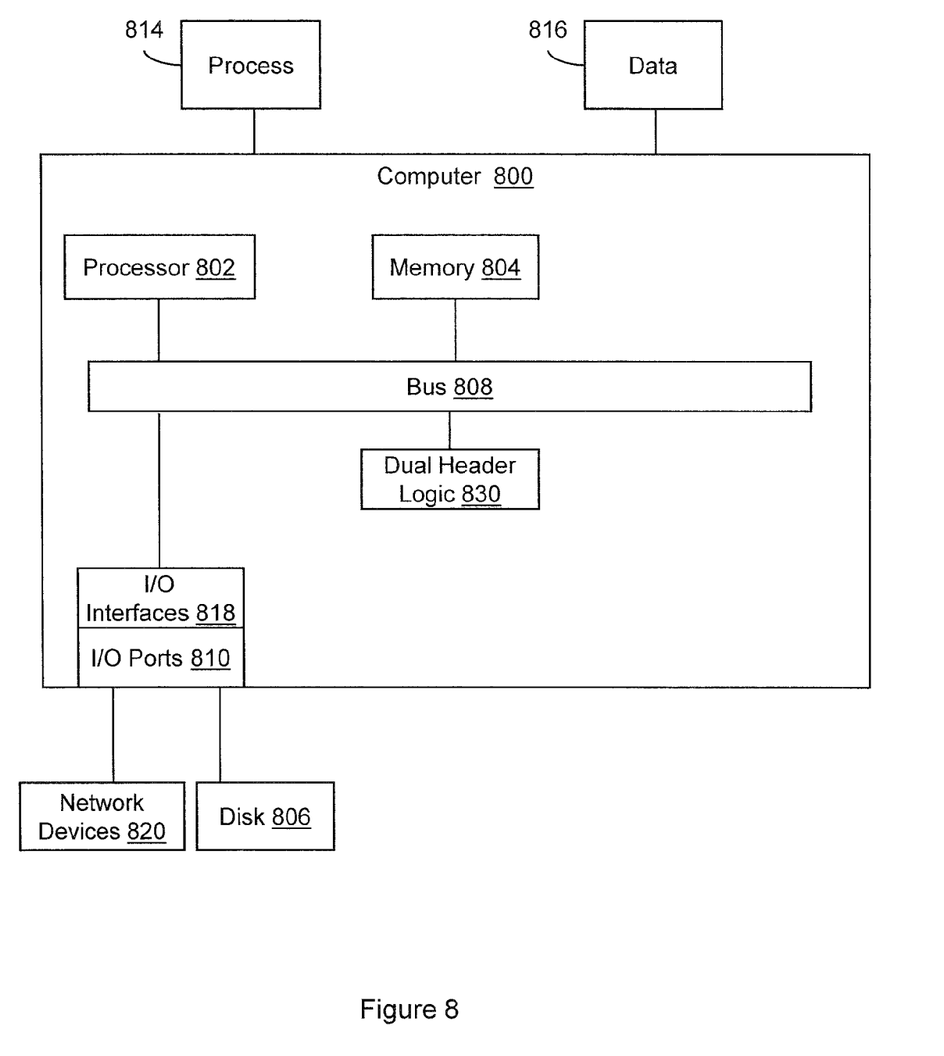
FIG. 8 illustrates an example computing environment in which example systems and methods, and equivalents, may operate.

"Logic", as used herein with respect to FIGS. 1, 2, and 8 includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

In one embodiment, the partition header 115 is created based, at least in part, on a partition information. The partition information may include data describing a set of applications executing on the networking device, a section of memory in the networking device, a division of processor cycles, and so on.

Apparatus 100 may also include a segmentation header logic 140 to insert a network segmentation header 145 into the data packet 120. Inserting the network segmentation header 145 does not displace the partition header 115. The network segmentation header 145 may facilitate selecting a network segment. In one embodiment, the network segment header 145 is associated with a grouping of gateways, a grouping of routers, a grouping of gateways comprising a gateway connected to the logical connection, a grouping of network devices, and so on.

In one embodiment, the network segmentation header 145 is created based, at least in part, on segmentation information. The segmentation information may include data describing a routing policy, a layer 2 switching operation policy, a virtual route forwarding (VRF) table, and so on. In one embodiment, segmentation of a network is based, at least in part, on the contents of the VRF table. The VRF table is associated with the network segmentation header 145.

In one embodiment, the network segmentation header 145 is a virtual local area network (VLAN) identifier (ID), a sub-network identifier, a virtual private network (VPN) ID, and so on. In one embodiment, the partition header 115 and the network segmentation header 145 are added to a QinQ header. In one embodiment, an outer header of the QinQ header stores the partition header 115 and an inner header of the QinQ header stores the network segmentation header 145. In one embodiment, the QinQ header is an 802.1q double header that comprises two headers. Other double header techniques (e.g. MPLS label stacking) could be leveraged to provide similar operation.

In one embodiment, a network segment is a grouping of networking devices. The grouping of network devices may include networking devices on the common interface, a portion of networking devices on the common interface, networking devices that are not part of the common interface, and so on. However, the networking devices that are not part of the common interface may be able to send data to the common interface by routing the data to networking devices on the common interface.

Apparatus 100 may also include a transmit logic 150 to send the data packet 120 onto a common interface employed by the set of logical partitions 135 and a set of network segments. In one example, the data packet 120 may include a data payload 155. The common interface may be a connection between two network devices. The two network devices may be logically partitioned and may include segmented networks. The set of logical partitions may represent a logically segmented networking device.

In one embodiment, a set of data packets travel on the common interface. The set of data packets may include a data packet with the network segmentation header and the partition header. The set of data packets may include a data packet without the network segmentation header and the partition header. Thus, the common interface may include data packets that use different network protocols and that include different network headers, tags, identifiers, and so on. Thus, apparatus 100 may not add the partition header 115 and/or the network segmentation header 145 to some of the data packet(s) 120 that travel the common interface. In one example, apparatus 100 may forward data packet(s) 120 that include the headers 115 and/or 145. However, apparatus 100 may also forward data packets that do not include headers 115 and 145.

In one embodiment, the apparatus 100 includes data distribution logic 170 for publishing partition information and segmentation information. Publishing the partition information and the segmentation information may include sharing information with a networking device to facilitate creating a partition header 115 and a network segmentation header 145 for a data packet 120. The data distribution logic 170 may be used to distribute information that allows a networking device and/or computing device to build the data packet 120. This may enable multiple gateways and/or networking devices to change or modify the header format to include the dual header information and/or format (e.g., partition header 115 and network segmentation header 145).

FIG. 2 illustrates an apparatus 200 associated with logically partitioned networking devices. Apparatus 200 includes a receive logic 210 to receive a data packet 220 from a common interface. The data packet 220 may include a partition header 225 and a network segmentation header 230. The partition header 225 facilitates selecting a member of a set of logical partitions on a networking device. The network segmentation header 230 facilitates selecting a member of a set of network segments associated with the networking device. The data packet 220 may include a data payload 235 that carries information.

In one embodiment, the network segmentation header 230 is a virtual local area network (VLAN) identifier (ID). The VLAN ID may identify an entry in a virtual routing and forwarding (VRF) table. The entry in the VRF table may facilitate controlling the routing of the data packet 220 through the network segment. The VRF table may include a policy and routing information. In one embodiment, the network segmentation header 230 identifies a virtual private network (VPN) segment that includes a route policy and a route prefix. The VPN segment may be identified by a virtual local area network (VLAN) identifier (ID). The route policy includes a quality of service (QoS) attribute, a security criteria associated with group association, and so on.

In one embodiment, the network segmentation header 230 is a virtual local area network (VLAN) identifier (ID), a subnetwork identifier, a virtual private network (VPN) ID, and so on. In one embodiment, segmentation of a network is based, at least in part, on the contents of the virtual routing forwarding (VRF) table. The VRF table is associated with the network segmentation header.

Apparatus 200 may also include a forwarding logic 240 to forward the data packet 220 to a logical partition of the apparatus 200 based, at least in part, on the partition header 225. The data packet 220 may be forwarded to the member of the set of network segments based, at least in part, on the network segmentation header 230.

In one embodiment, apparatus 200 may also include a configuration stage logic 250 to receive an information from an advertising logic 255. The information may be associated with partitioning the apparatus 200 and network segmentation. The configuration stage logic 250 may receive the information from the advertising logic 255 that is associated with an apparatus similar to apparatus 100 of FIG. 1. In one embodiment, the configuration stage logic 250 receives the information from the advertising logic 255 and acknowledges receipt of the information to the advertising logic 255.

In one embodiment, the apparatus 200 may also include elements similar to elements in apparatus 100 of FIG. 1. The apparatus 200 may include a partition header logic to insert the partition header 225 into the data packet 220. The partition header 225 may identify a member of a set of logical partitions. The apparatus 200 may also include a segmentation header logic to insert the network segmentation header 230 into the data packet 220. Insertion of the network segmentation header 230 does not displace the partition header 225. The network segmentation header 230 may facilitate selection of a network segment. The apparatus 200 may also include a transmit logic to send the data packet 220 onto the common interface associated with the set of logical partitions and a set of network segments.

Apparatus 100 and apparatus 200 may facilitate creating a dual header (e.g., apparatus 100) and using the dual header for route forwarding of data packets by networking devices (e.g., apparatus 200). The dual header may facilitate logically partitioned networking devices to work in environments that include network segments. Additionally, the header may facilitate creating a bridge or special link between logical partitions and network segments.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 3:
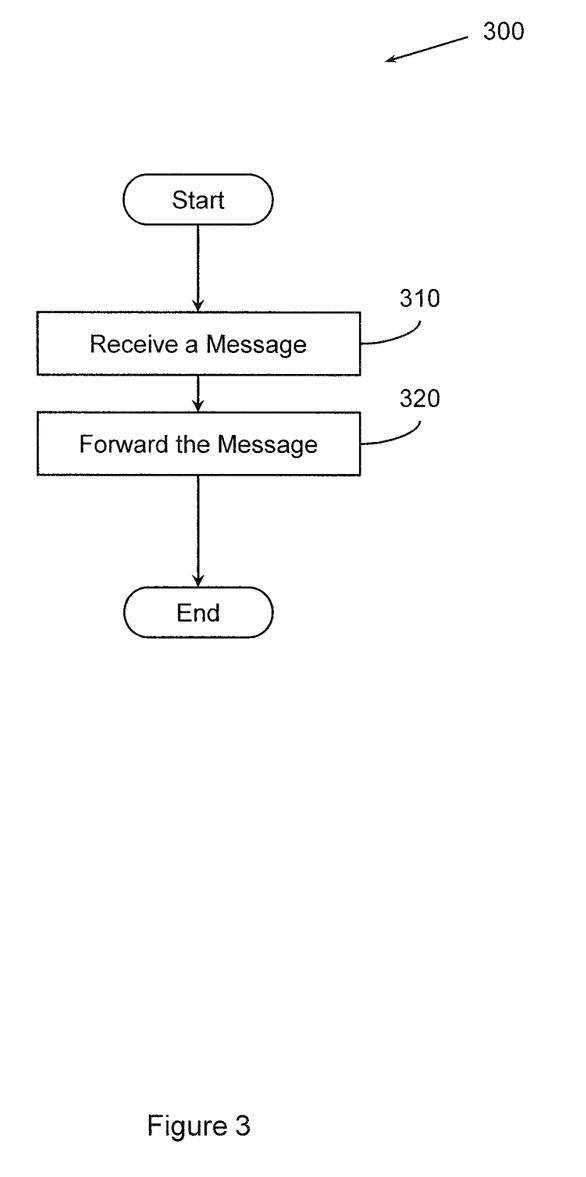
FIG. 3 illustrates an example method associated with logically partitioned networking devices.

FIG. 3 illustrates a method 300 associated with logically partitioned networking devices. Method 300 may include, at 310, receiving a message. The message is received at 310 from a common interface. The message may include a logical partition header (LPH) and a network segmentation header (NSH). The LPH may be associated with a logical partition of a networking device. The NSH may be associated with a grouping of networking devices.

In one embodiment, creating the LPH is based, at least in part, on a set of applications executing on the networking device, a section of memory in the networking device, a division of processor cycles (e.g., in the networking device), and so on. These divisions of the networking device and/or a computing device may be logical partitions of the device. In one embodiment, creating the NSH is based, at least in part, on a routing policy, a layer 2 switching operation policy, a virtual route forwarding (VRF) table, and so on. The policies and the VRF table may include data regarding a network segmentation format and/or layout. This data may be used to construct the NSH that conforms to the network segmentation format and/or layout.

Method 300 may also include, at 320, forwarding the message. The forwarding may include forwarding to both a logical partition and a network segment. The message is forwarded at 320 to the network segment based, at least in part, on the NSH and a virtual route forwarding (VRF) table. Forwarding the message to the logical partition of the networking device may be based, at least in part, on the LPH.

While FIG. 3 illustrates various actions occurring in serial, it is to be appreciated that various actions illustrated in FIG. 3 could occur substantially in parallel. By way of illustration, a first process could receive messages at 310, and a second process could forward messages at 320. While two processes are described, it is to be appreciated that a greater and/or lesser number of processes could be employed and that lightweight processes, regular processes, threads, and other approaches could be employed.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 300. While executable instructions associated with the above method are described as being embodied as a logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 4:
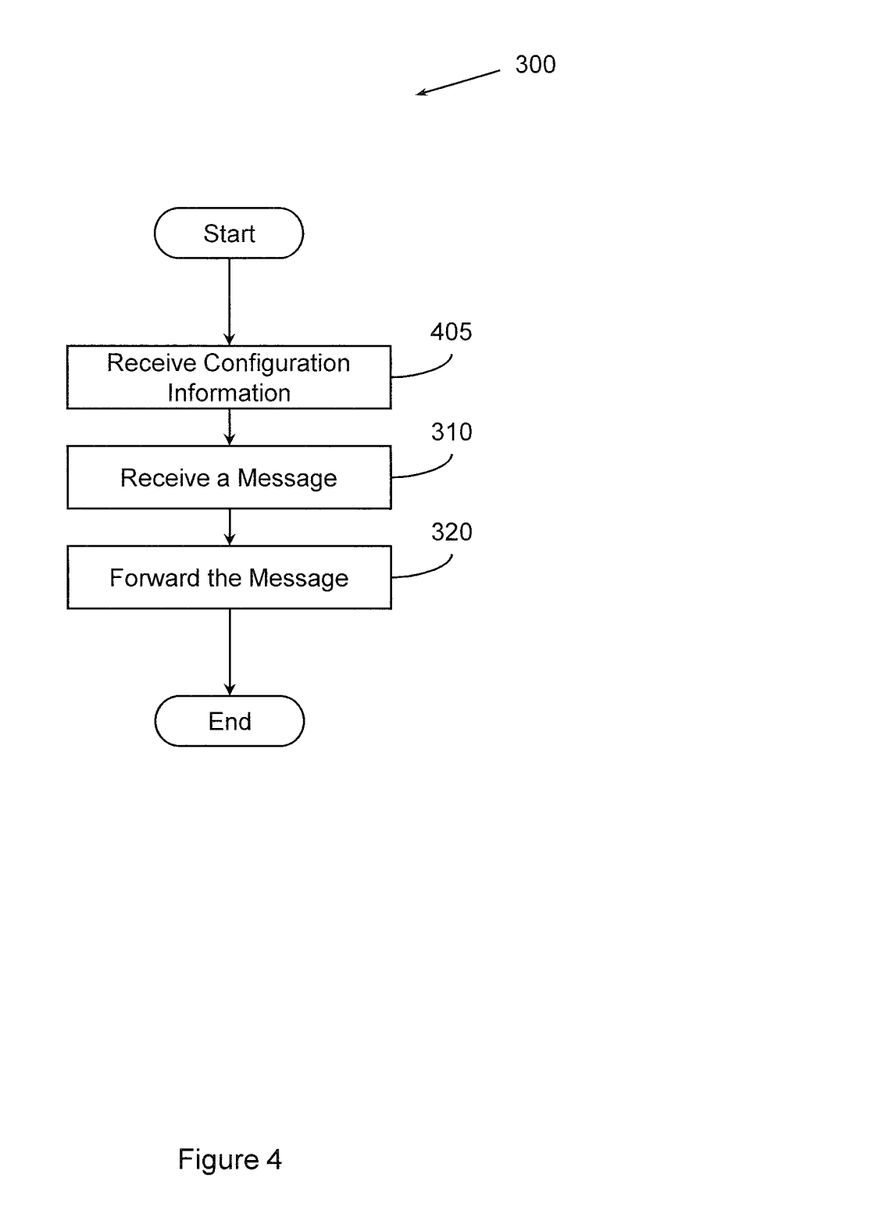
FIG. 4 illustrates another example method associated with logically partitioned networking devices.

FIG. 4 illustrates another embodiment of method 300. This embodiment of method 300 includes, at 405, receiving configuration information. The configuration information may be associated with partitioning a networking device and segmenting a grouping of network devices. The configuration information facilitates forwarding the message to the grouping of networking devices and to the logical partition of the networking device. In the embodiment, the configuration information includes the VRF table, a routing policy, a quality of service (QoS) parameter, and so on.

Figure 5:
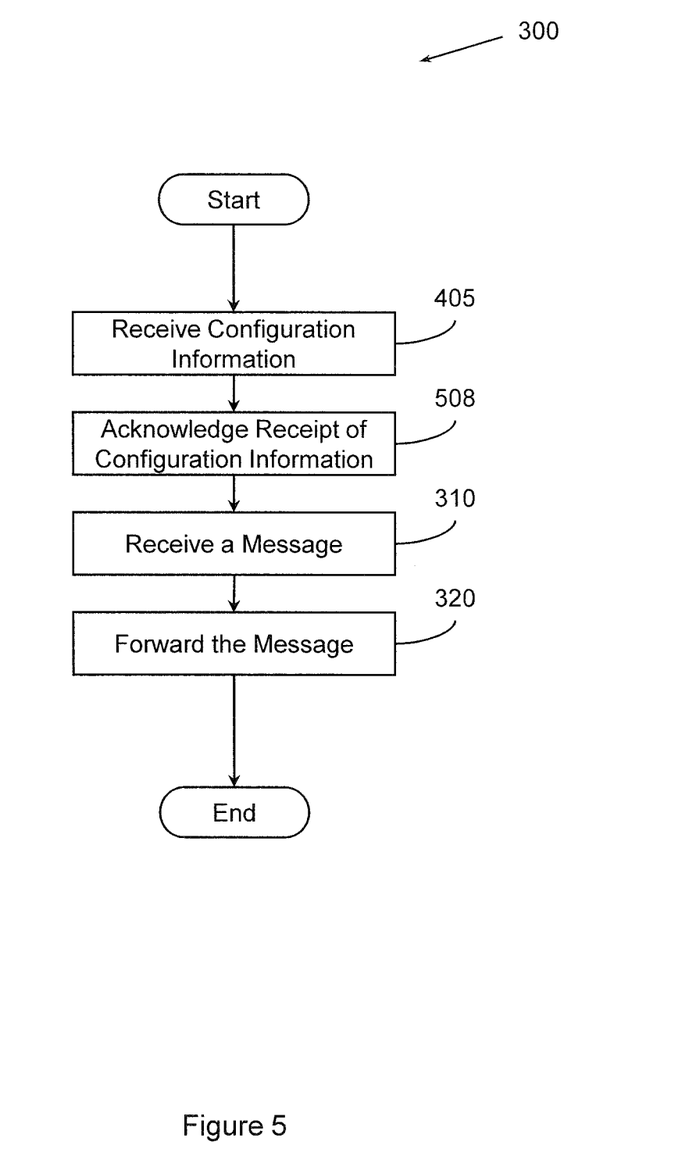
FIG. 5 illustrates another example method associated with logically partitioned networking devices.

FIG. 5 illustrates another embodiment of method 300. This embodiment of method 300 includes, at 508, acknowledging receipt of the configuration information. Receipt of the configuration information may be acknowledged at 508 to the provider of the configuration information. The provider of the configuration information may be similar to the data distribution logic 170 of FIG. 1.

Figure 6:
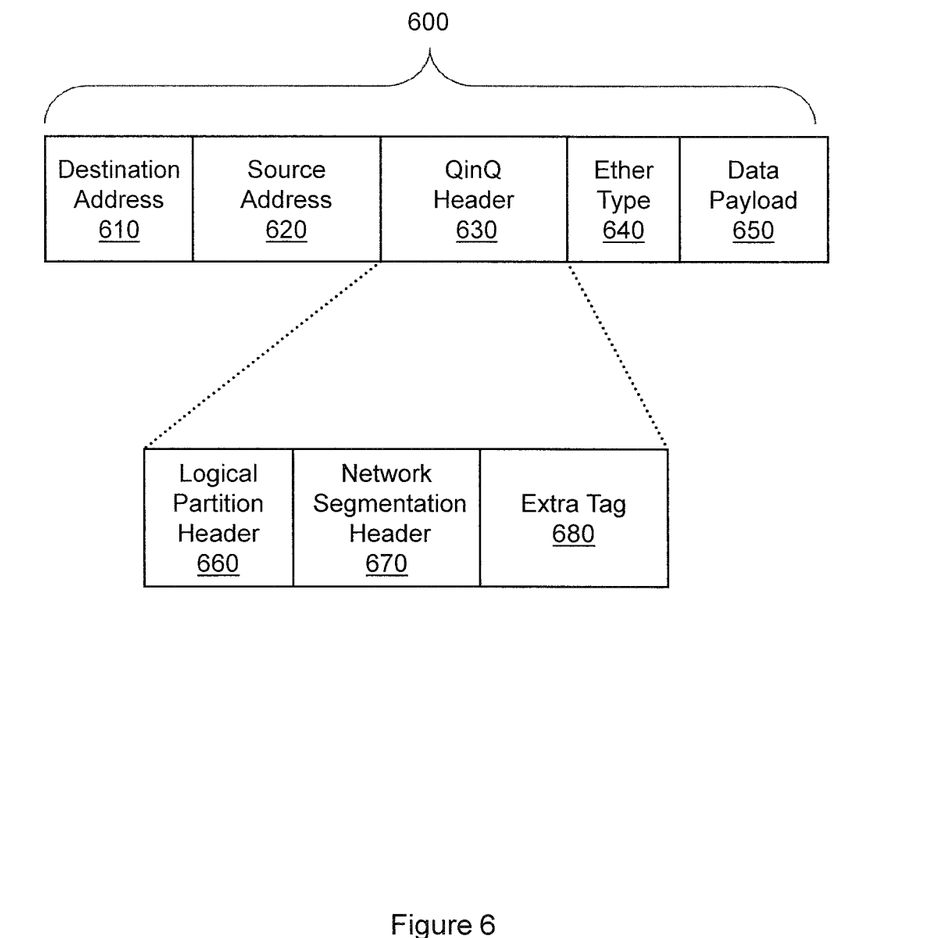
FIG. 6 illustrates an example header associated with logically partitioned networking devices.

FIG. 6 illustrates an example header 600 with a QinQ header 630 (e.g., dual header) that facilitates routing traffic associated with logically partitioned networking devices. The QinQ header 630 may be useful for Internet service providers (ISPs) of small scale networks (e.g., campus networks) because the QinQ header allows the use of internal VLANs while mixing traffic from clients that are already VLAN-tagged. The format of the QinQ header 630 may include an outer tag, followed by the inner tag. The QinQ header 630 may be an example of an 802.1q standard dual tag described in amendment 802.1ad. QinQ may provide bridge protocols to provide separate instances of media access control (MAC) services to multiple independent users of a bridged LAN that does not require cooperation among the multiple independent users. For example, a VLAN associated with logical partitioning may not need to cooperate (e.g., store information regarding) a second VLAN associated with network segmentation.

The data packet 600 may include a destination address 610. The destination address 610 may be a MAC address. The data packet 600 may also include a source address 620 that may be the MAC address of the source of the data packet 600. A QinQ header 630 (e.g., dual header) may also be included in the data packet 600. Data packet 600 may include an ether type 640 and a data payload 650. One skilled in the art will realize that data packet 600 may include other tags and may include a different ordering of the existing tags, and include a larger or smaller number of tags.

The QinQ header 630 may include a logical partition header 660 (e.g., outer tag, outer header) and a network segmentation header 670 (e.g., inner tag, inner header). The QinQ header 630 may also include an extra tag 680 that may be an additional ether tag for a VLAN associated with the inner tag or the outer tag. The additional ether tag may be similar to ether type 640 and may identify the ether type of either the inner tag or the outer tag and the associated VLAN of that tag. The QinQ header 630 may facilitate the use of network segments associated with the network segment header 670, with logical partitions associated with logical partition header 660, and so on.

Figure 7:
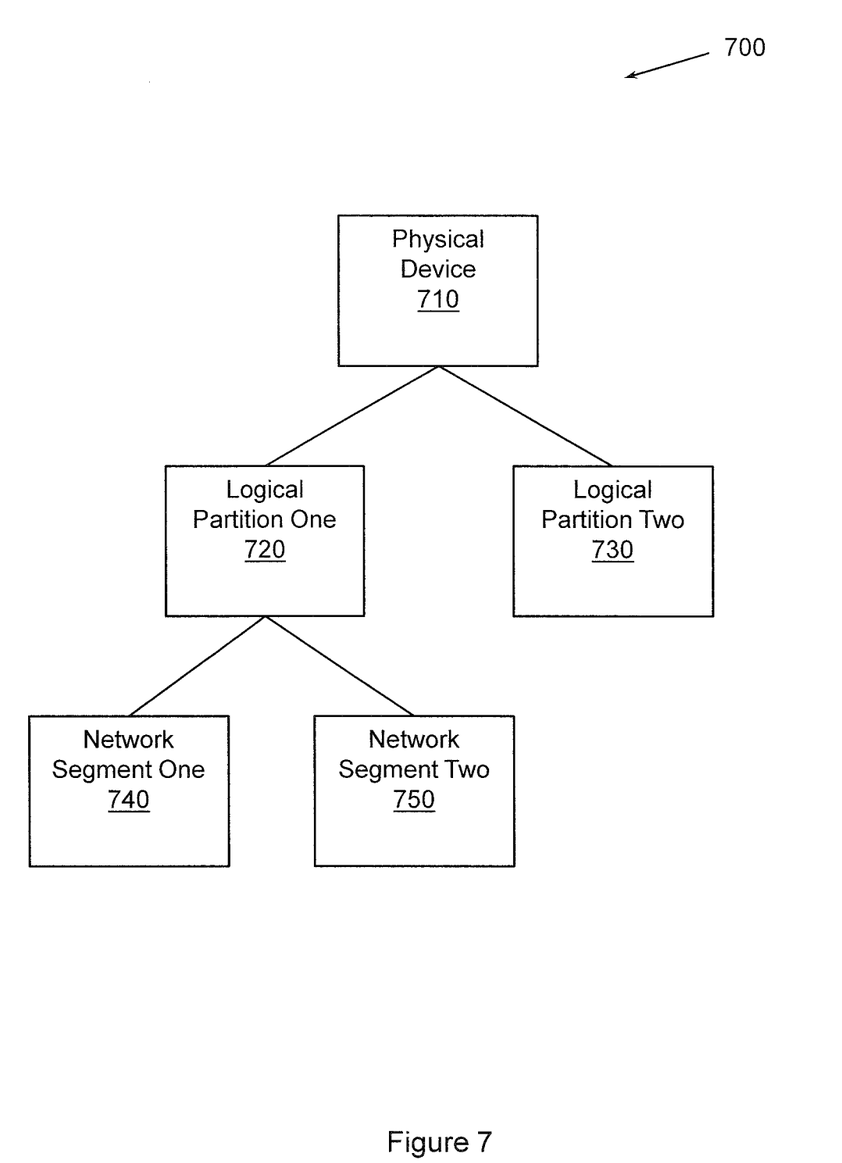
FIG. 7 illustrates an example environment associated with logically partitioned networking devices.

FIG. 7 illustrates an example environment 700 associated with logically partitioned networking devices. Environment 700 may include a physical device 710 (e.g., a networking device, router, networking switch, gateway). The physical device 710 may be partitioned into logical devices or logical partitions. For example, physical device 710 may include logical partition one 720 and logical partition two 730. These logical partitions 720 and 730 may be similar to members of the set of logical partitions 135 in FIG. 1.

Logical partitions may store information regarding different network segments. For example, logical partition one 720 may store information in a data store related to network segment one 740 and network segment two 750. However, the dual header (e.g., QinQ header) may make it unnecessary for the logical partitions 720 and 730 to store information related to all of the network segments. The inner header, associated with network segmentation, may provide a bridge protocol to provide separate services to multiple independent users (e.g., the logical partitions and the network segments) of a bridged LAN. This may remove the need for cooperation among the multiple independent users.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a dual header logic 830 configured to facilitate logically partitioned networking devices. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Hardware component", as used herein, refers to a computer-related entity. Hardware components may include, for example, a process running on a processor, a processor, an object, an executable, and a thread of execution. A hardware component(s) may include a process and/or thread. A hardware component may be localized on one computer and/or may be distributed between multiple computers.

Logic 830 may provide means (e.g., hardware, software, firmware) for receiving a data packet from a common interface. The data packet may include a partition header and a network segmentation header. The partition header may facilitate selecting a member of a set of logical partitions on a networking device. The network segmentation header may facilitate selecting a member of a set of network segments associated with the networking device. The means may be implemented, for example, as an ASIC programmed to facilitate logically partitioned networking devices. The means may also be implemented as computer executable instructions that are presented to computer 800 as data 816 that are temporarily stored in memory 804 and then executed by processor 802.

Logic 830 may also provide means (e.g., hardware, software, firmware) for forwarding the data packet to the grouping of networking devices based, at least in part, on the network segmentation header and a virtual route forwarding (VRF) table. Logic 830 may also provide means (e.g., hardware, software, firmware) for forwarding the data packet to the logical partition of the networking device based, at least in part, on the partition header.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD recordable (CD-R) drive, a CD rewriteable (CD-RW) drive, a digital versatile disk and/or digital video disk read only memory (DVD ROM), and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, universal serial bus (USB), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is.

1. An apparatus, comprising:
one or more computer processors;
a receipt logic to receive a data packet that includes:
a partition header as an outer header of a QinQ header of the data packet, where the partition header identifies a first one of a plurality of logical partitions on the apparatus to be used to process the data packet, and wherein each logical partition of the plurality of logical partitions comprises a respective virtual route forwarding (VRF) table; and
a network segmentation header as an inner header of the QinQ header of the data packet, where the network segmentation header does not displace the partition header, and where the network segmentation header identifies a first one of a plurality of network segments;

a forwarding logic to forward the data packet to the first logical partition of the apparatus, based on a determination that the partition header within the data packet identifies the first logical partition of the apparatus;

a control logic to access an entry in the VRF table for the first logical partition, relating to the first network segment, and based on the network segmentation header, to determine routing information for the data packet; and a transmit logic to send the data packet onto a common interface, according to the determined routing information, wherein the common interface is shared by the plurality of logical partitions and the plurality of network segments.

2. The apparatus of claim 1, where the plurality of logical partitions partition the apparatus, the apparatus being one or more of, a gateway, a router, and a networking switch, and where the first logical partition of the plurality of logical partitions comprises one or more of, a logical set of applications, a logical set of memory, and a logical set of processor cycles.

3. The apparatus of claim 1, where the network segmentation header is associated with one or more of, a grouping of gateways, a grouping of routers, a grouping of gateways comprising a gateway connected to a logical connection, and a grouping of network devices.

4. The apparatus of claim 1, where the partition header is created based, at least in part, on a partition information, where the partition information comprises data describing one or more of, a set of applications executing on a networking device, a section of memory in the networking device, and a division of processor cycles.

5. The apparatus of claim 4, where the network segmentation header is created based, at least in part, on a segmentation information, and where the segmentation information comprises data describing one or more of, a routing policy, a layer 2 switching operation policy, and a virtual route forwarding (VRF) table.

6. The apparatus of claim 5, comprising:
a data distribution logic for publishing a partition information and a segmentation information, where publishing the partition information and the segmentation information comprises sharing information with a networking device to facilitate creating a partition header and a network segmentation header for a data packet.

7. The apparatus of claim 5, where segmentation of a network is based, at least in part, on contents of the VRF table, and where the VRF table is associated with the network segmentation header.

8. The apparatus of claim 1, where the network segmentation header is one or more of, a virtual local area network (VLAN) identifier (ID), a subnetwork identifier, and a virtual private network (VPN) identifier.

9. The apparatus of claim 1, where a set of data packets travel on the common interface, where the set of data packets include a data packet with the network segmentation header and the partition header, and where the set of data packets include a data packet without the network segmentation header and the partition header.

10. The apparatus of claim 1, where the QinQ header is an 802.1q double header that comprises two headers.

11. A network device, comprising:
one or more computer processors;
a common interface;
logic to receive a data packet from the common interface, where the data packet comprises a QinQ header containing both a partition header and a network segmentation header, where the partition header is stored as an outer header of the QinQ header and facilitates selecting a first one of a plurality of logical partitions on the network device to be used to process the data packet, wherein the network segmentation header is stored as an inner header of the QinQ header and facilitates selecting a first one of a plurality of network segments associated with the network device, and wherein each logical partition of the plurality of logical partitions comprises a respective virtual route forwarding (VRF) table; and logic to:
determine that the first one of the plurality of logical partitions of the network device corresponds to the partition header within the received data packet;

forward the data packet, by operation of the one or more computer processors, to the determined first logical partition, access an entry in a VRF table for the first logical partition, relating to the first network segment, and based on the network segmentation header, to determine routing information for the data packet, and transmit the data packet according to the determined routing information.

12. The network device of claim 11, comprising:
a configuration stage logic to receive an information from an advertising logic, where the information is associated with partitioning of the network device and network segmentation.

13. The network device of claim 12, where the configuration stage logic receives the information from the advertising logic and acknowledges receipt of the information to the advertising logic.

14. The network device of claim 11, where the network segmentation header is a virtual local area network (VLAN) identifier (ID), where the VLAN ID identifies an entry in a virtual routing and forwarding (VRF) table, where the entry in the VRF table facilitates controlling routing of the data packet through the first one of the plurality of network segments, and where the VRF table comprises a policy and a routing information.

15. The network device of claim 11, where the network segmentation header identifies a virtual private network (VPN) segment that comprises a route policy and a route prefix, where the VPN segment is identified by a virtual local area network (VLAN) identifier (ID), and where the route policy comprises one or more of, a quality of service (QoS) attribute, and a security criteria associated with group association.

16. The network device of claim 11, where the network segmentation header is one or more of, a virtual local area network (VLAN) identifier (ID), a subnetwork identifier, and a virtual private network (VPN) identifier.

17. The network device of claim 11, where segmentation of a network is based, at least in part, on contents of a virtual routing forwarding (VRF) table, where the VRF table is associated with the network segmentation header.

18. The network device of claim 11, wherein the data packet is received from a second network device, the second network device comprising:
a partition header logic to insert the partition header into the data packet, where the partition header identifies the first logical partition of the plurality of logical partitions;

a segmentation header logic to insert the network segmentation header into the data packet, where insertion of the network segmentation header does not displace the partition header, where the network segmentation header facilitates selection of a network segment; and a transmit logic to send the data packet onto the common interface associated with the plurality of logical partitions and a set of network segments.

19. A logic encoded in one or more non-transitory media for execution which, when executed, performs an operation, the operation comprising:
receiving a data packet, at a networking device, from a common interface, where the data packet comprises a QinQ header containing both a partition header and a network segmentation header, where the partition header is stored as an outer header of the QinQ header and facilitates selecting a first one of a plurality of logical partitions on the networking device to be used to process the data packet, wherein the network segmentation header is stored as an inner header of the QinQ header and facilitates selecting a first one of a plurality of network segments associated with the networking device, and wherein each logical partition of the plurality of logical partitions comprises a respective virtual route forwarding (VRF);
determining that the partition header specified within the received data packet identifies the first one of the plurality of logical partitions of the network device;
forwarding the data packet, by operation of one or more computer processors, to the identified first logical partition of the network device;
accessing an entry in a VRF table for the first logical partition, relating to the first network segment, and based on the network segmentation header, to determine routing information for the data packet; and
transmitting the data packet according to the determined routing information.

20. The logic of claim 19, where the partition header is based, at least in part, on one or more of, a set of applications executing on the networking device, a section of memory in the networking device, and a division of processor cycles.

21. The logic of claim 19, where the network segmentation header is based, at least in part, on one or more of, a routing policy, a layer 2 switching operation policy, and the VRF table.

22. The logic of claim 19, the operation comprising:
receiving a configuration information from a provider of the configuration information, where the configuration information is associated with partitioning a networking device and segmenting a grouping of network devices, where the configuration information facilitates forwarding the data packet to the grouping of network devices and to the identified first logical partition of the networking device.

23. The logic of claim 22, the operation comprising:
acknowledging receipt of the configuration information to the provider of the configuration information.

24. The logic of claim 22, where the configuration information comprises one or more of, the VRF table, a route policy, and a quality of service (QoS) parameter.

25. A method of transmitting a data packet, comprising:
receiving the data packet from a common interface, where the data packet comprises a QinQ header containing both a partition header and a network segmentation header, where the partition header is stored as an outer header of the QinQ header and facilitates selecting a first one of a plurality of logical partitions on a networking device to be used to process the data packet, and where the network segmentation header is stored as an inner header of the QinQ header and facilitates selecting a first one of a plurality of network segments associated with the networking device;
determining that the partition header specified within the received data packet identifies the first of the plurality of logical partitions of the network device;
forwarding the data packet, by operation of one or more computer processors, to the determined first logical partition of the networking device;
accessing an entry in a virtual route forwarding (VRF) table relating to the first network segment, based on the network segmentation header; and
transmitting the data packet according to the accessed entry in the VRF table and the first logical partition.

* * * * *